United States Patent
Mak-Fan et al.

(10) Patent No.: US 8,885,733 B2
(45) Date of Patent: *Nov. 11, 2014

(54) SYSTEM AND METHOD FOR PROVIDING A VARIABLE FRAME RATE AND ADAPTIVE FRAME SKIPPING ON A MOBILE DEVICE

(75) Inventors: David Mak-Fan, Waterloo (CA); Aaron Bradley Small, Ottawa (CA); Thomas Charles Nagy, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/605,913

(22) Filed: Sep. 6, 2012

(65) Prior Publication Data

US 2012/0328268 A1  Dec. 27, 2012

Related U.S. Application Data

(63) Continuation of application No. 11/944,549, filed on Nov. 23, 2007, now Pat. No. 8,279,946.

(51) Int. Cl.
| | |
|---|---|
| H04N 7/12 | (2006.01) |
| H04N 21/4402 | (2011.01) |
| H04N 19/172 | (2014.01) |
| H04N 21/434 | (2011.01) |
| H04N 19/587 | (2014.01) |
| H04N 19/61 | (2014.01) |
| H04N 19/156 | (2014.01) |
| H04N 19/44 | (2014.01) |
| H04N 21/442 | (2011.01) |
| H04N 19/159 | (2014.01) |
| H04N 19/132 | (2014.01) |
| H04N 21/414 | (2011.01) |

(52) U.S. Cl.
CPC . *H04N 19/00781* (2013.01); *H04N 21/440281* (2013.01); *H04N 19/00266* (2013.01); *H04N 21/4341* (2013.01); *H04N 19/00751* (2013.01); *H04N 19/00206* (2013.01); *H04N 19/00533* (2013.01); *H04N 21/4424* (2013.01); *H04N 19/00218* (2013.01); *H04N 19/00127* (2013.01); *H04N 21/41407* (2013.01)
USPC .................................................. 375/240.28

(58) Field of Classification Search
CPC .................. H04N 21/4307; H04N 21/440281; H04N 21/434
USPC ........................................ 375/240.28, 240.02
See application file for complete search history.

(56) References Cited

U.S. PATENT DOCUMENTS 6,510,553 B1 * 1/2003 Hazra .............................. 725/87
6,747,991 B1    6/2004 Hemy et al.
(Continued)

*Primary Examiner* — Chirag Shah
*Assistant Examiner* — Jenkey Van
(74) *Attorney, Agent, or Firm* — Brett J. Slaney; Blake, Cassels & Graydon LLP

(57) ABSTRACT

A processor and method are provided for decoding a multimedia file having video and audio data streams that are configured to be played in synchronization. Frames of the video stream are decoded and played with the audio and, to compensate for saturation of the processor usage, two procedures are performed. The first procedure operates at a first periodic interval and slows down the frame rate to reduce processor usage if needed. The second procedure first attempts to speed up the video to catch up to the audio if they are out of sync and if this cannot be done in the next time interval, the decoding of a select number of frames is skipped such that the video and audio data streams are resynchronized.

14 Claims, 10 Drawing Sheets

(56) References Cited

U.S. PATENT DOCUMENTS

| | | | |
|---|---|---|---|
| 6,803,964 B1 * | 10/2004 | Post et al. | 348/423.1 |
| 6,985,966 B1 | 1/2006 | Gupta et al. | |
| 7,787,578 B2 | 8/2010 | Hsieh et al. | |
| 2005/0084237 A1 * | 4/2005 | Kellner et al. | 386/68 |
| 2006/0233259 A1 | 10/2006 | Chou et al. | |

* cited by examiner

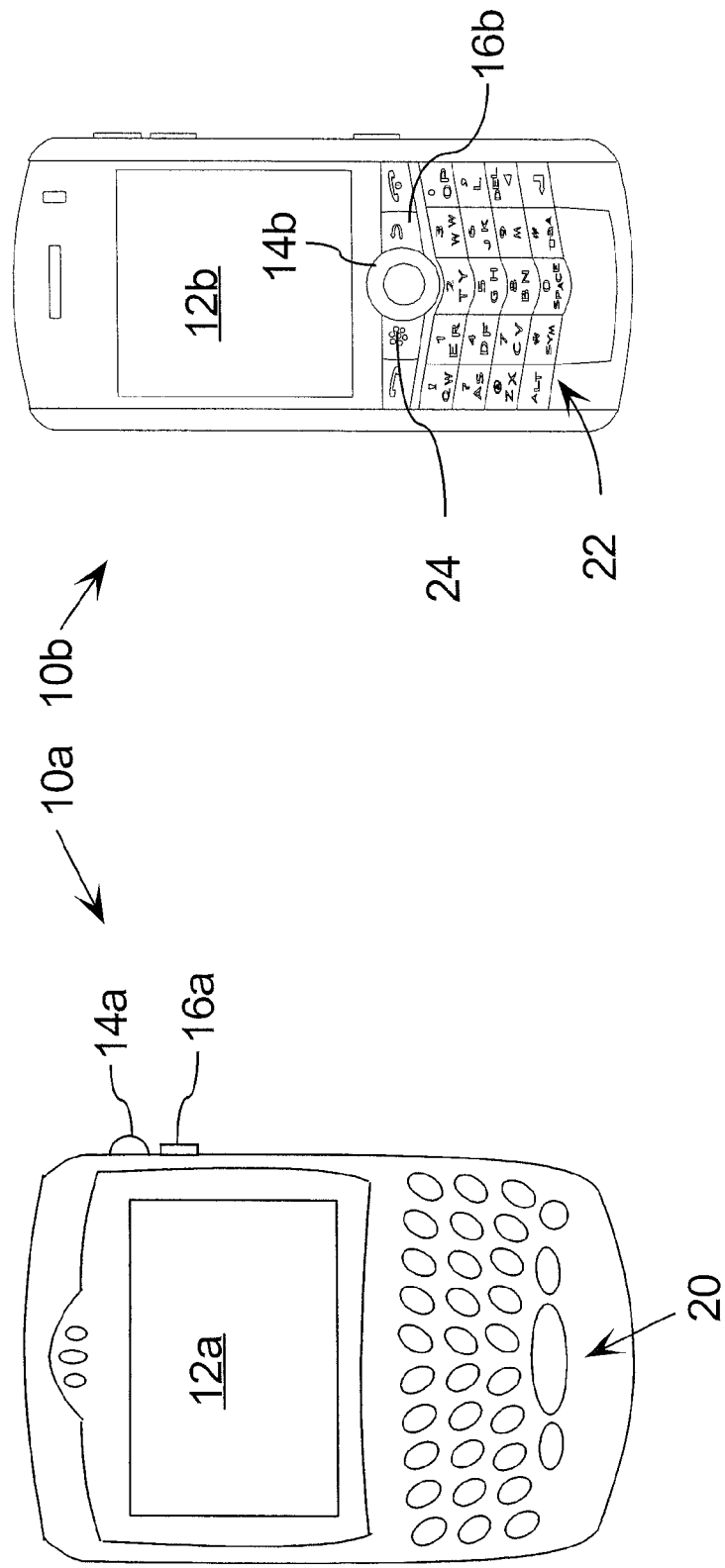

SYSTEM AND METHOD FOR PROVIDING A VARIABLE FRAME RATE AND ADAPTIVE FRAME SKIPPING ON A MOBILE DEVICE

CROSS-REFERENCE TO RELATED APPLICATIONS

The present application is a continuation of U.S. patent application Ser. No. 11/944,549 filed on Nov. 23, 2007 incorporated herein by reference.

TECHNICAL FIELD

The following relates to systems and methods for decoding multimedia files according to processor usage.

DESCRIPTION OF THE PRIOR ART

A computing device, such as a mobile device, uses a processor to perform tasks. Each task inherently consumes a certain percentage of the processor's overall capability. However, it is well known that mobile devices generally have weaker processors than, e.g., personal computers (PCs). Many tasks, often referred to as non-interactive tasks, are fixed tasks that are scheduled by a scheduling algorithm. Other tasks, often referred to as interactive tasks, in some way relate to recent input/output (I/O) traffic or user related tasks, such as user input or user directed output. The scheduling algorithm typically aims to schedule interactive tasks for optimal low latency and non-interactive tasks for optimal throughput. An example of a non-interactive task is video decoding, which is done in the background (i.e. the user will not notice as it occurs), and an example of an interactive task is a keystroke or status bar update that the user can presumably view on the display of the mobile device.

The video content currently expected to be played on a mobile device often pushes the capabilities of mobile processors such that in some circumstances, the mobile device cannot decode a video in real-time. Also, scheduling video decoding can be difficult as the system load felt due to video decoding is heavily dependent on the content of the video. Attempting to decode such video content can saturate the processor and, on a multi-thread system, where user interface (UI) runs at a lower priority thread, the user's input and control of the device may feel unresponsive.

For example, in a mobile device, when a task saturates the central processor, a keystroke or user directed output such as a status bar update may not respond in a timely manner. Also, a mobile device that is decoding a video may be sluggish when responding to a user moving a positioning device (e.g. to move a cursor on the screen). When encountering the above, the result is often a poor viewing experience, which can be made worse if the video is synchronized with audio content.

Previous methods of simply dropping frames is not always possible because of temporal coding tools used in modern video codecs, e.g., MPEG-4, where a video frame relies on data from previous or future frames. Also, the system load may vary (spike) due to asynchronous events such as when receiving email or other radio traffic.

BRIEF DESCRIPTION OF THE DRAWINGS

Embodiments will now be described by way of example only with reference to the appended drawings wherein:

FIG. 1 is a schematic diagram of a mobile device and a display screen therefor.

FIG. 2 is a schematic diagram of another mobile device and a display screen therefor.

DETAILED DESCRIPTION OF THE DRAWINGS

Figure 3:
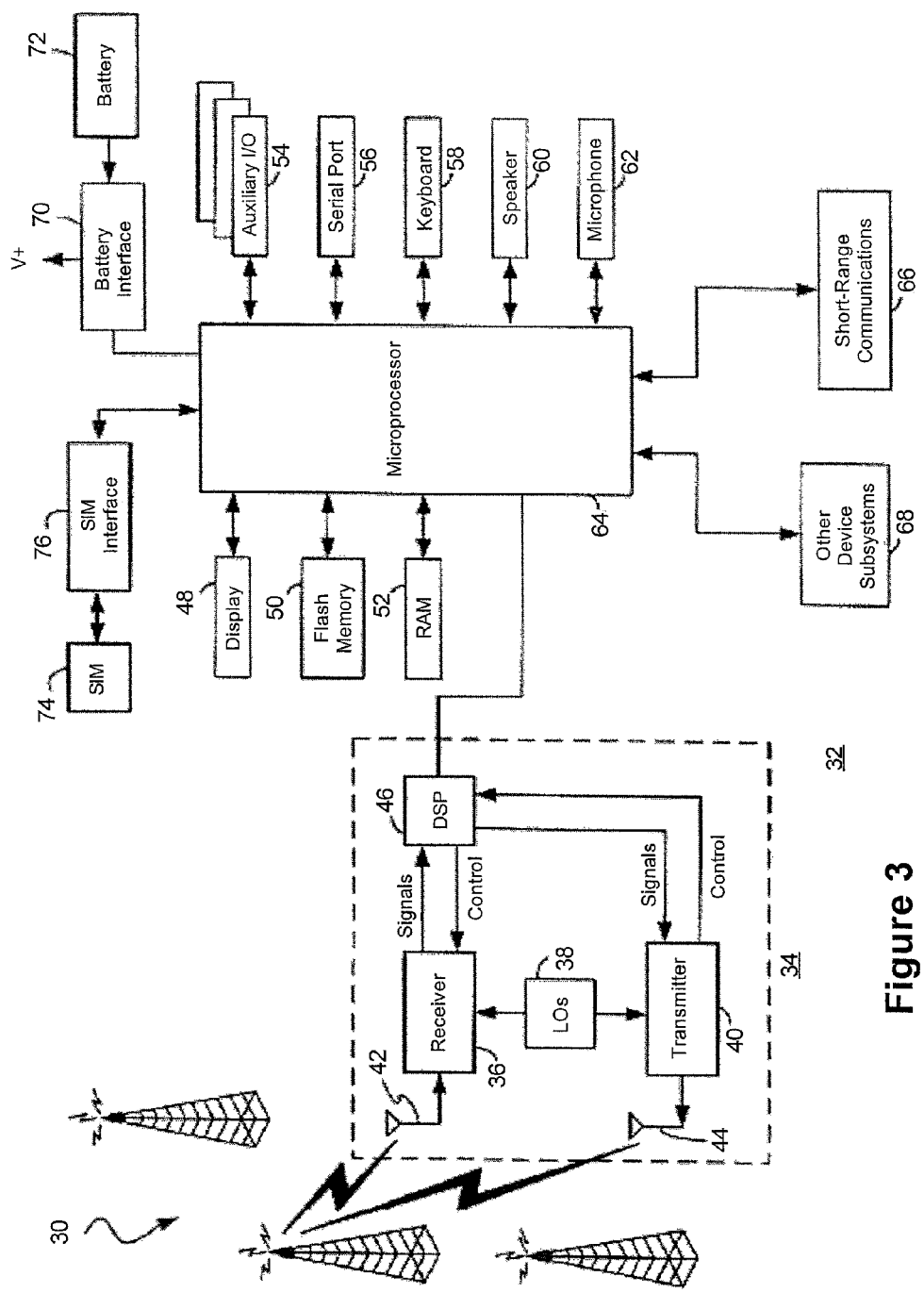
FIG. 3 is a schematic block diagram of components of the mobile device of any or both of FIGS. 1 and 2.

A processor, mobile device and method performed thereby are now described for providing a variable frame rate and adaptive frame skipping on a mobile device to, among other things, absorb spikes in processor load to improve the overall viewing experience on such mobile devices when decoding multimedia files.

Referring now to FIGS. 1 and 2, one embodiment of a mobile device 10a is shown in FIG. 1, and another embodiment of a mobile device 10b is shown in FIG. 2. It will be appreciated that the numeral "10" will hereinafter refer to any mobile device 10, including the embodiments 10a and 10b. It will also be appreciated that a similar numbering convention may be used for other general features common between FIGS. 1 and 2 such as a display 12, a positioning device 14, and a cancel or escape button 16.

The mobile device 10a shown in FIG. 1 comprises a display 12a and the cursor or view positioning device 14 shown in this embodiment is a positioning wheel 14a. Positioning device 14 may serve as another input member and is both rotatable to provide selection inputs to the processor 64 (see FIG. 3) and can also be pressed in a direction generally toward housing to provide another selection input to the processor 64. The display 12 may include a selection cursor 18 (see FIG. 5) that depicts generally where the next input or selection will be received. The selection cursor 18 may comprise a box, alteration of an icon or any combination of features that enable the user to identify the currently chosen icon or item. The mobile device 10a in FIG. 1 also comprises an escape or cancel button 16a and a keyboard 20. In this example, the keyboard 20 is disposed on the front face of the mobile device housing and positioning device 14 and cancel button 16a are disposed at the side of the housing to enable a user to manoeuvre the positioning wheel 16a while holding the mobile device 10 in one hand. The keyboard 20 is in this embodiment a standard QWERTY keyboard.

The mobile device 10b shown in FIG. 2 comprises a display 12b and the positioning device 14 in this embodiment is a trackball 14b. Trackball 14b permits multi-directional positioning of the selection cursor 18 such that the selection cursor 18 can be moved in an upward direction, in a downward direction and, if desired and/or permitted, in any diagonal direction. The trackball 14b is preferably situated on the front face of a housing for mobile device 10b as shown in FIG. 2 to enable a user to manoeuvre the trackball 14b while holding the mobile device 10b in one hand. The trackball 14b may serve as another input member (in addition to a directional or positioning member) to provide selection inputs to the processor 64 and can preferably be pressed in a direction towards the housing of the mobile device 10b to provide such a selection input.

The mobile device 10b also comprises a menu or option button 24 that loads a menu or list of options on display 12b when pressed, and a cancel or escape button 16b to exit, "go back" or otherwise escape from a feature, option, selection or display. The mobile device 10b as illustrated in FIG. 2, comprises a reduced QWERTY keyboard 22. In this embodiment, the keyboard 22, positioning device 14, escape button 16b and menu button 24 are disposed on a front face of a mobile device housing.

The reduced QWERTY keyboard 22 comprises a plurality of multi-functional keys and corresponding indicia including keys associated with alphabetic characters corresponding to a QWERTY array of letters A to Z and an overlaid numeric phone key arrangement. The plurality of keys that comprise alphabetic and/or numeric characters total fewer than twenty-six (26). In the embodiment shown, the number of keys that comprise alphabetic and numeric characters is fourteen (14). In this embodiment, the total number of keys, including other functional keys, is twenty (20). The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows.

The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

It will be appreciated that for the mobile device 10, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 10 etc.), or other whether presently known or unknown may be employed. Similarly, any variation of keyboard 20, 22 may be used. It will also be appreciated that the mobile devices 10 shown in FIGS. 1 and 2 are for illustrative purposes only and various other mobile devices 10, presently known or unknown are equally applicable to the following examples.

Movement, navigation, and/or scrolling with use of a cursor/view positioning device 14 (e.g. trackball 14b or positioning wheel 14a) is beneficial given the relatively large size of visually displayed information and the compact size of display 12, and since information and messages are typically only partially presented in the limited view of display 12 at any given moment. As previously described, positioning devices 14 such as the positioning wheel 14a and trackball 14b, are helpful cursor/view positioning mechanisms to achieve such movement. Positioning device 14, which may be referred to as a positioning wheel or scroll device 14a in one embodiment (FIG. 1), specifically includes a circular disc which is rotatable about a fixed axis of housing and may be rotated by the end user's index finger or thumb. As noted above, in another embodiment (FIG. 2) the trackball 14b comprises a multi-directional member that enables upward, downward and if desired, diagonal movements. The multi-directional movements afforded, in particular, by the trackball 14b and the presentation of icons and folders on display 12 provides the user with flexibility and familiarity of the layout of a traditional desktop computer interface. Also, the positioning device 14 enables movement and selection operations to be executed on the mobile device 10 using one hand. The trackball 14b in particular also enables both one-handed use and the ability to cause a cursor 18 to traverse the display 12 in more than one direction.

FIG. 3 is a detailed block diagram of an embodiment of a mobile station 32. The term "mobile station" will herein refer to the operable components of, e.g. mobile device 10. Mobile station 32 is preferably a two-way communication device having at least voice and advanced data communication capabilities, including the capability to communicate with other computer systems. Depending on the functionality provided by mobile station 32, it may be referred to as a data messaging device, a two-way pager, a cellular telephone with data messaging capabilities, a wireless Internet appliance, or a data communication device (with or without telephony capabilities)—e.g. mobile device 10 shown in FIGS. 1 and 2. Mobile station 32 may communicate with any one of a plurality of fixed transceiver stations 30 within its geographic coverage area.

Mobile station 32 will normally incorporate a communication subsystem 34 which includes a receiver 36, a transmitter 40, and associated components such as one or more (preferably embedded or internal) antenna elements 42 and 44, local oscillators (LOs) 38, and a processing module such as a digital signal processor (DSP) 46. As will be apparent to those skilled in field of communications, particular design of communication subsystem 34 depends on the communication network in which mobile station 32 is intended to operate.

Mobile station 32 may send and receive communication signals over a network after required network registration or activation procedures have been completed. Signals received by antenna 42 through the network are input to receiver 36, which may perform such common receiver functions as signal amplification, frequency down conversion. filtering, channel selection, and like, and in example shown in FIG. 3, analog-to-digital (A/D) conversion. A/D conversion of a received signal allows more complex communication functions such as demodulation and decoding to be performed in DSP 46. In a similar manner, signals to be transmitted are processed, including modulation and encoding, for example, by DSP 46. These DSP-processed signals are input to transmitter 40 for digital-to-analog (D/A) conversion, frequency up conversion, filtering, amplification and transmission over communication network via antenna 44. DSP 46 not only processes communication signals, but also provides for receiver and transmitter control. For example, the gains applied to communication signals in receiver 36 and transmitter 40 may be adaptively controlled through automatic gain control algorithms implemented in DSP 46.

Network access is associated with a subscriber or user of mobile station 32. In one embodiment, mobile station 32 uses a Subscriber Identity Module or "SIM" card 74 to be inserted in a SIM interface 76 in order to operate in the network. SIM 74 is one type of a conventional "smart card" used to identify an end user (or subscriber) of the mobile station 32 and to personalize the device, among other things. Without SIM 74, the mobile station terminal in such an embodiment is not fully operational for communication through a wireless network. By inserting SIM 74 into mobile station 32, an end user can have access to any and all of his/her subscribed services. SIM 74 generally includes a processor and memory for storing information. Since SIM 74 is coupled to a SIM interface 76, it is coupled to microprocessor 64 through communication lines. In order to identify the subscriber, SIM 74 contains some user parameters such as an International Mobile Subscriber Identity (IMSI). An advantage of using SIM 74 is that end users are not necessarily bound by any single physical mobile station. SIM 74 may store additional user information for the mobile station as well, including datebook (or calendar) information and recent call information. It will be appreciated that mobile station 32 may also be used with any other type of network compatible mobile device 10 such as those being code division multiple access (CDMA) enabled and should not be limited to those using and/or having a SIM card 74.

Mobile station 32 is a battery-powered device so it also includes a battery interface 70 for receiving one or more rechargeable batteries 72. Such a battery 72 provides electrical power to most if not all electrical circuitry in mobile station 32, and battery interface 70 provides for a mechanical and electrical connection for it. The battery interface 70 is coupled to a regulator (not shown) which provides a regulated voltage to all of the circuitry.

Mobile station 32 in this embodiment includes a microprocessor 64 which controls overall operation of mobile station 32. It will be appreciated that the microprocessor 64 may be implemented by any processing device. Communication functions, including at least data and voice communications are performed through communication subsystem 34. Microprocessor 64 also interacts with additional device subsystems which may interface with physical components of the mobile device 10. Such addition device subsystems comprise a display 48, a flash memory 50, a random access memory (RAM) 52, auxiliary input/output subsystems 54, a serial port 56, a keyboard 58, a speaker 60, a microphone 62, a short-range communications subsystem 66, and any other device subsystems generally designated at 68. Some of the subsystems shown in FIG. 3 perform communication-related functions, whereas other subsystems may provide "resident" or on-device functions. Notably, some subsystems such as keyboard 58 and display 48, for example, may be used for both communication-related functions, such as entering a text message for transmission over a communication network, and device-resident functions such as a calculator or task list. Operating system software used by microprocessor 64 is preferably stored in a persistent store such as flash memory 50, which may alternatively be a read-only memory (ROM) or similar storage element (not shown). Those skilled in the art will appreciate that the operating system, specific device applications, or parts thereof, may be temporarily loaded into a volatile store such as RAM 52.

Microprocessor 64, in addition to its operating system functions, preferably enables execution of software applications on mobile station 32. A predetermined set of applications which control basic device operations, including at least data and voice communication applications, as well as the inventive functionality of the present disclosure, will normally be installed on mobile station 32 during its manufacture. A preferred application that may be loaded onto mobile station 32 may be a personal information manager (PIM) application having the ability to organize and manage data items relating to user such as, but not limited to, e-mail, calendar events, voice mails, appointments, and task items. Naturally, one or more memory stores are available on mobile station 32 and SIM 74 to facilitate storage of PIM data items and other information.

The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 32 with respect to such items. This is especially advantageous where the host computer system is the mobile station user's office computer system. Additional applications may also be loaded onto mobile station 32 through network, an auxiliary subsystem 54, serial port 56, short-range communications subsystem 66, or any other suitable subsystem 68, and installed by a user in RAM 52 or preferably a non-volatile store (not shown) for execution by microprocessor 64. Such flexibility in application installation increases the functionality of mobile station 32 and may provide enhanced on-device functions, communication-related functions, or both. For example, secure communication applications may enable electronic commerce functions and other such financial transactions to be performed using mobile station 32.

In a data communication mode, a received signal such as a text message, an e-mail message, or web page download will be processed by communication subsystem 34 and input to microprocessor 64. Microprocessor 64 will preferably further process the signal for output to display 48 or alternatively to auxiliary I/O device 54. A user of mobile station 32 may also compose data items, such as e-mail messages, for example, using keyboard 58 in conjunction with display 48 and possibly auxiliary I/O device 54. These composed items may be transmitted over a communication network through communication subsystem 34.

For voice communications, the overall operation of mobile station 32 is substantially similar, except that the received signals would be output to speaker 60 and signals for transmission would be generated by microphone 62. Alternative voice or audio I/O subsystems, such as a voice message recording subsystem, may also be implemented on mobile station 32. Although voice or audio signal output is preferably accomplished primarily through speaker 60, display 48 may also be used to provide an indication of the identity of a calling party, duration of a voice call, or other voice call related information, as some examples.

Serial port 56 in FIG. 3 is normally implemented in a personal digital assistant (PDA)-type communication device for which synchronization with a user's desktop computer is a desirable, albeit optional, component. Serial port 56 enables a user to set preferences through an external device or software application and extends the capabilities of mobile station 32 by providing for information or software downloads to mobile station 32 other than through a wireless communication network. The alternate download path may, for example, be used to load an encryption key onto mobile station 32 through a direct and thus reliable and trusted connection to thereby provide secure device communication.

Short-range communications subsystem 66 of FIG. 3 is an additional optional component which provides for communication between mobile station 32 and different systems or devices, which need not necessarily be similar devices. For example, subsystem 66 may include an infrared device and associated circuits and components, or a Bluetooth™ communication module to provide for communication with similarly enabled systems and devices. Bluetooth™ is a registered trademark of Bluetooth SIG, Inc.

Figure 4:
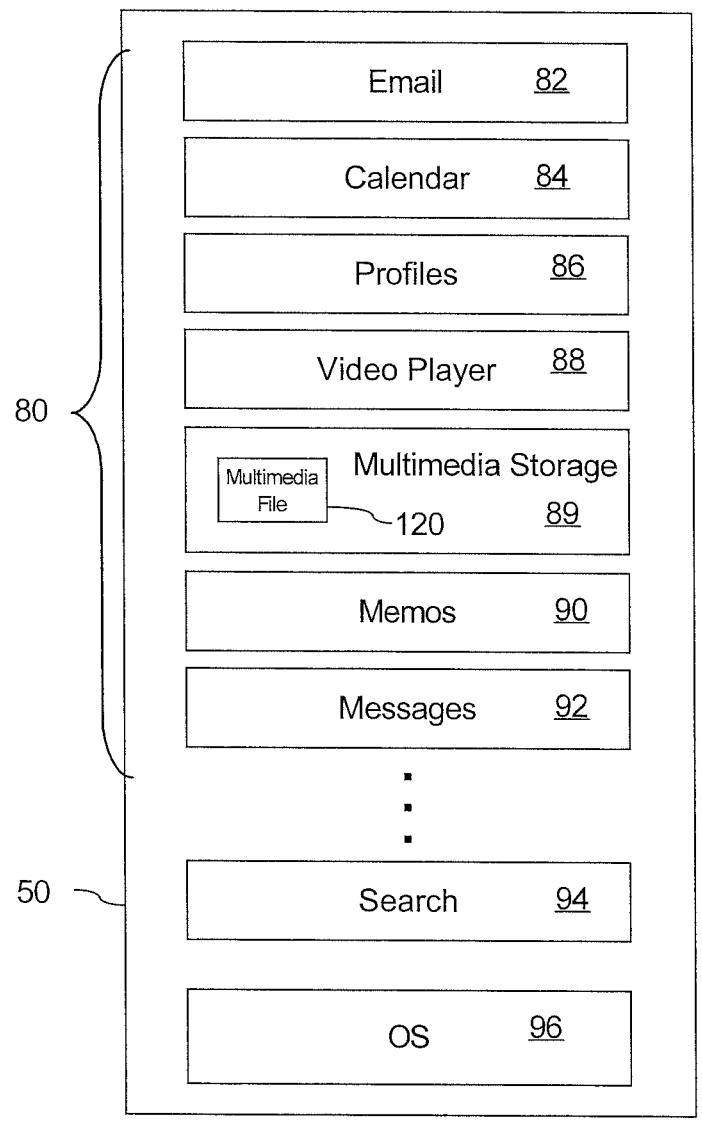
FIG. 4 is a schematic block diagram of the memory shown in FIG. 3.

As shown in FIG. 4, memory 50 includes a plurality of applications 80 associated with a series of icons 102 (see FIG. 5) for the processing of data. Applications 80 may be any variety of forms such as, without limitation, software, firmware, and the like. Applications 80 may include, for example, electronic mail (e-mail) 82, calendar program 84, storage and/or program for contacts 86, a multimedia/video player application 88, memo program 90, storage for messages 92, a search function and/or application 94 etc. An operating system (OS) 96, and in this embodiment a multimedia storage area 89 also reside in memory 50. The multimedia storage area 89 is generally a designated portion of memory 50 for storing multimedia files 120 that are used by the multimedia/video player 88. The multimedia/video player 88 will hereinafter, for brevity, be referred to as a 'video player 88' (as shown in FIG. 4).

The mobile devices 10 of the present disclosure are also configured to enable communication between different ones of the applications 80, e.g. between contacts application 86 and the email application 82. Also, the icons 102 for the applications on the mobile devices 10 can be modified, named, moved, sorted and otherwise interacted with for the purposes of organizing and/or manipulating the visibility of the icons for those applications 102.

Figure 5:
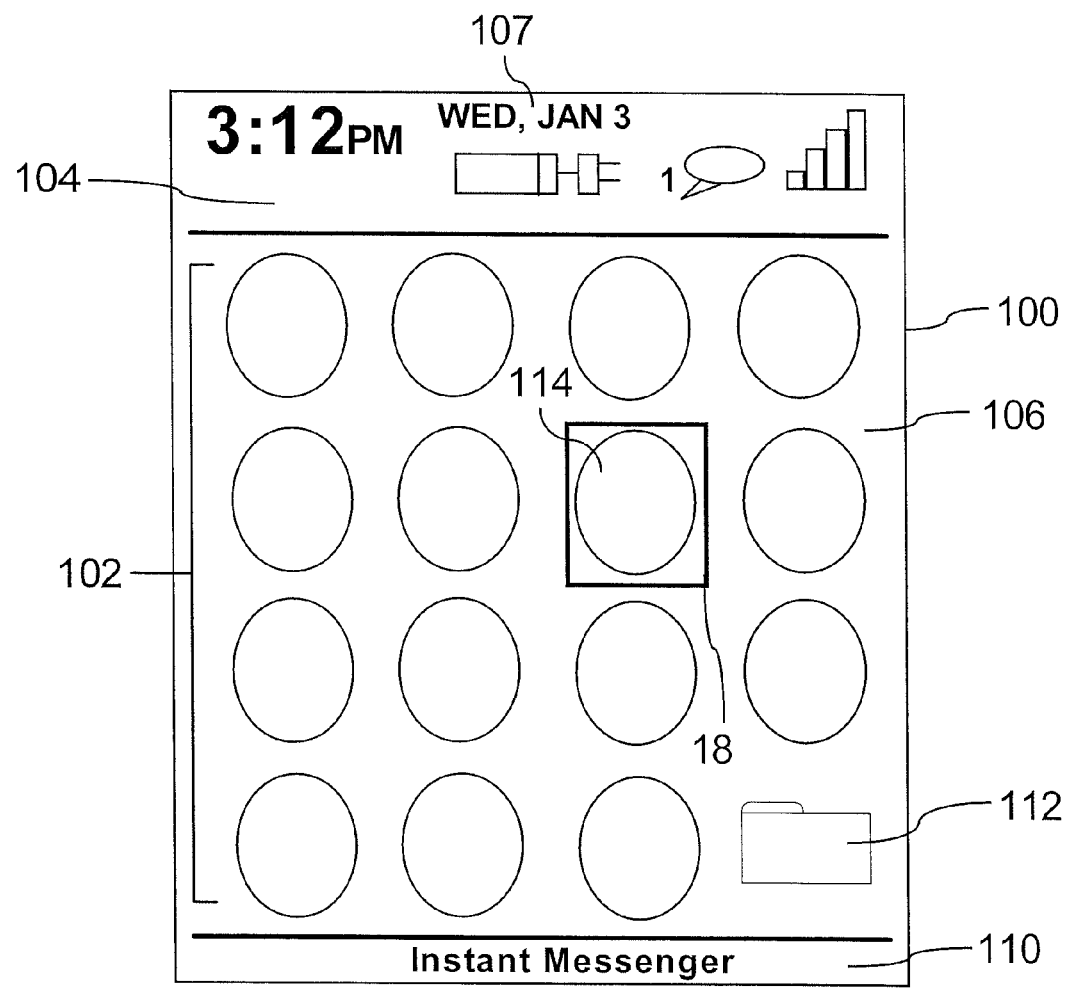
FIG. 5 is a screen shot of a home screen for the mobile device of any or both of FIGS. 1 and 2.

Turning now to FIG. 5, the mobile device 10 displays a home screen 100, which is preferably the active screen when the mobile device 10 is powered up and constitutes the main ribbon application. The home screen 100 generally comprises a status region 104 and a theme background 106, which provides a graphical background for the display 12. The theme background 106 displays a series of icons 102 in a predefined arrangement on a graphical background.

In some themes, the home screen 100 may limit the number icons 102 shown on the home screen 100 so as to not detract from the theme background 106, particularly where the background 106 is chosen for aesthetic reasons. The theme background 106 shown in FIG. 5 provides a grid of icons. In other themes (not shown), a limited list of icons may be displayed in a column (or row) on the home screen along one portion of the display 12. In yet another theme, the entire list of icons may be listed in a continuous row along one side of the home screen on the display 12 enabling the user to scroll through the list while maintaining a limited number of currently visible icons on the display 12. In yet another theme (not shown), metadata may be displayed with each of a limited number of icons shown on the home screen. For example, the next two appointments in the user's calendar may be accessed by the processor 64 and displayed next to the calendar icon. It will be appreciated that preferably several themes are available for the user to select and that any applicable arrangement may be used.

One or more of the series of icons 102 is typically a folder 112 that itself is capable of organizing any number of applications therewithin.

The status region 104 in this embodiment comprises a date/time display 107. The theme background 106, in addition to a graphical background and the series of icons 102, also comprises a status bar 110. The status bar 110 provides information to the user based on the location of the selection cursor 18, e.g. by displaying a name for the icon 102 that is currently highlighted.

Accordingly, an application, such as a video player application 88 may be initiated (opened or viewed) from display 12 by highlighting a multimedia/video icon 114 using the positioning device 14 and providing a suitable user input to the mobile device 10. For example, video player application 88 may be initiated by moving the positioning device 14 such that the contacts icon 114 is highlighted as shown in FIG. 5, and providing a selection input, e.g. by pressing the trackball 14b.

As noted above, one or more multimedia files 120 are stored in the multimedia storage portion 89 of memory 50, which are configured to be used with the video player 88. Multimedia files 120 are typically stored in a compressed (encoded) form that must be decompressed (decoded) by the processor 64 in order to be played on the video player 88. It will be appreciated that the multimedia files 120 may be loaded from an external source through a web browser or downloaded from a web site accessed through the communication system 34 and need not be stored directly on the mobile device 10. As such, locally stored and streaming content is applicable to the principles discussed herein.

Figure 6:
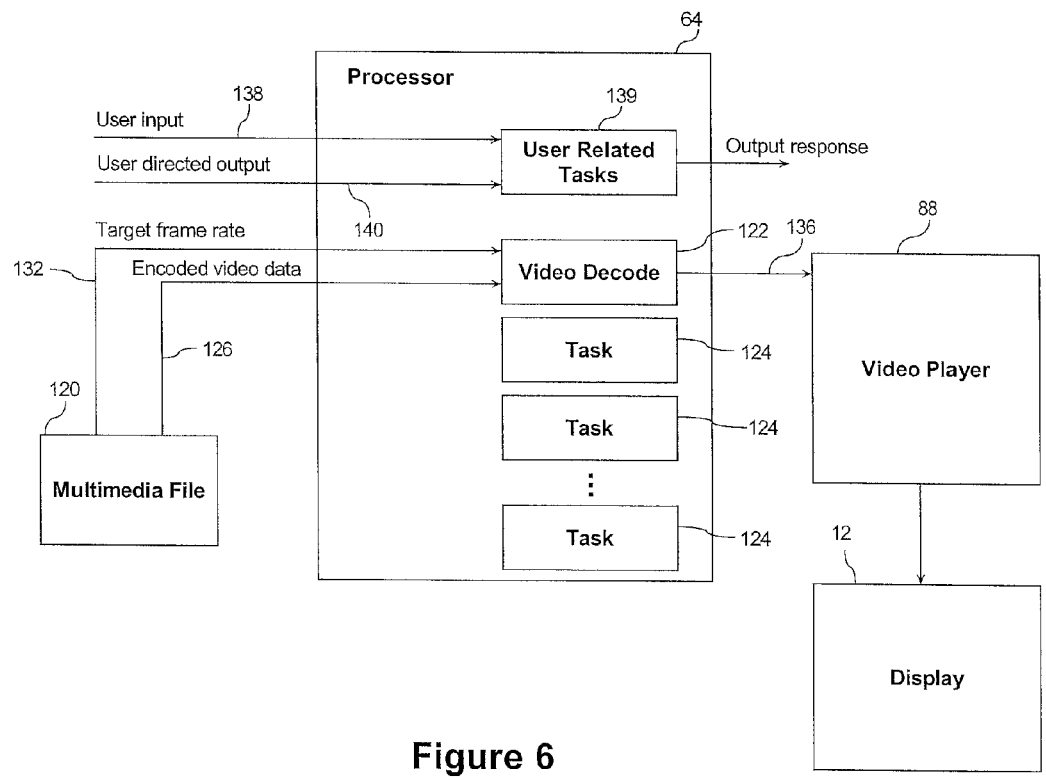
FIG. 6 is a schematic block diagram of a processor used in decoding a multimedia file.

In one embodiment, video decoding is one of a number of tasks that the processor 64 is responsible for performing using computer executable instructions contained on a computer readable medium. Referring now to FIG. 6, the processor 64 is shown with a number of defined tasks 124 that execute a particular set of instructions for providing a function or service on the mobile device 10. In the example of video decoding, a video decoding task 122 obtains a target video frame rate 132 and the encoded video data 126 or video data stream from the multimedia file 120 stored in memory 50. The video decoding task 122 decodes the encoded video data 126 and provides decoded data 136 to the video player 88 at a particular frame rate that is preferably close to or exactly at the target frame rate 132. The video player 88 is responsible for playing the video on the display 12 using a suitable user interface such as a video portal, viewer etc. Although not shown in FIG. 6, if corresponding audio data 130 (see FIG. 7) exists for the video data stream 126, the video player 88 also processes and plays the audio data stream 130 with the video data stream 126.

As can be seen in FIG. 6, the processor 64 also processes user input 138 (e.g. keystrokes or positioning device movements) and user directed output 140 (e.g. status bar updates such as displaying an "unread mail" icon) to perform user related tasks 139. It may be noted that when a user is watching a video, they typically do not interact with the device (e.g. with user related tasks 139) the majority of the time. As such, when scheduling video decoding tasks 122, it has been recognized that allocating resources for the user related tasks 139 (e.g. UI related resources) is more efficiently allocated on-demand or dynamically, e.g. according to the procedures discussed below.

Figure 7:
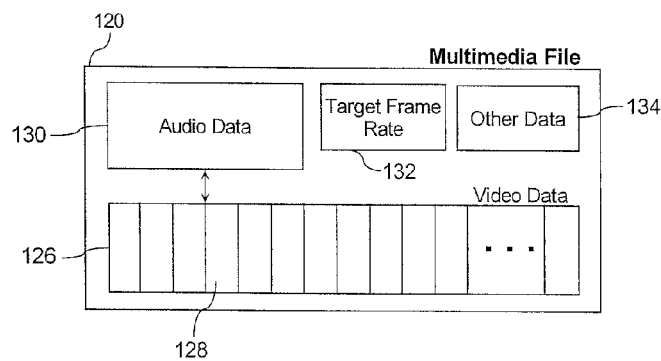
FIG. 7 is a schematic block diagram of the multimedia file shown in FIG. 6.

Turning now to FIG. 7, a multimedia file 120 is shown in greater detail. The multimedia file 120 contains a set of encoded video data 126 being made up of a series of frames 128, a set or stream of audio data 130 that corresponds to (synchronized to be played with) the video data stream 126 stored therein, the target frame rate 132 for that particular set of video data 126 (e.g. 30 frames per second), and other data 134 such as file name, codec information, author etc.

In the following embodiment, the video data stream 126 is encoded using MPEG video encoding, e.g. MPEG-4, however, it will be appreciated that the principles discussed below are equally applicable to other encoding/decoding schemes. In MPEG video encoding, a group of pictures is used to specify the order in which intra-frame and inter-frames are arranged, wherein the group of pictures is a stream of encoded frames in the video data stream 126. The frames 128 in MPEG encoding are of the following types: An I-frame (intra coded) corresponds to a fixed image and is independent of other picture types. Each group of pictures begins with this type of frame. A P-frame (predictive coded) contains difference information from the preceding I or P-frame. A B-frame (bidirectionally predictive coded) contains difference information from the preceding and/or following I or P-frame. D frames may also be used, which are DC direct coded pictures that serve the fast advance. In the following examples, video data stream 126 having I, B and P frames is used.

Figure 8:
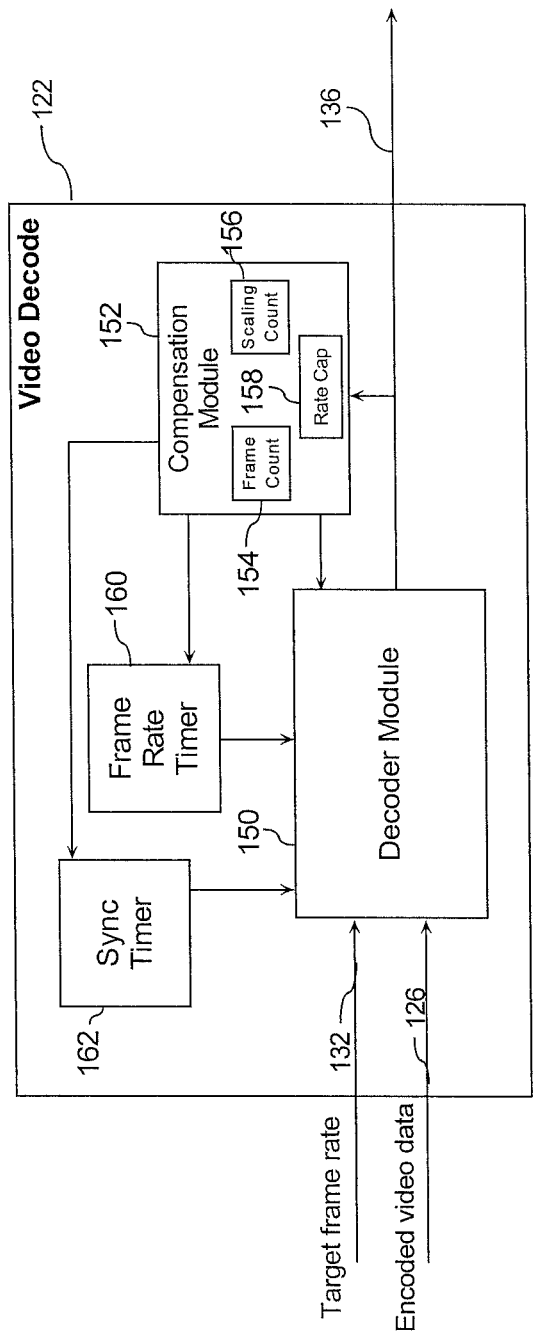
FIG. 8 is a schematic block diagram of the video decode task shown in FIG. 6.

As shown in FIG. 6, the video decode task 122 receives the encoded video data stream 126 and the target frame rate 132 and outputs decoded video 136 for the video player 88. The general components of the video decode task 122 are shown in greater detail in FIG. 8. The video decode task 122 includes a decoder module 150 that decodes the video data stream 126 on a frame by frame basis. A compensation module 152 schedules and monitors the decoding process and updates an internal frame count 154 and scaling factor 156 as required during a compensation procedure performed thereby as explained below. The compensation module 152 also communicates with the decoder module 150 to modify the decode schedule as needed. For video data 126 utilizing I, P and B frames, the frame count 154 tracks the number of frames decoded since the last I-frame. The scaling factor 156 keeps track of the average scaling in previous decodes experienced as a result of executions of the compensation procedure described below. The compensation module 152 also keeps track of a frame rate cap 158 that limits the upward scaling amount such that re-scaling the video decode frame rate to catch up to the audio data stream 130 will not compete with the purpose of the compensation procedure and saturate the processor 64.

The compensation module 152 adjusts a frame rate timer 160 in response to the scaling that is deemed to be necessary, and the frame rate timer 160 instructs the decoder 150 at which rate to decode frames 128. The compensation module 152 also reacts to a synchronization (sync) timer 162 at predetermined intervals (e.g. 1 second) and monitors the decoding process to determine if synchronization between the video data stream 126 and the audio data stream 130 is required. As will be explained below, the compensation module 152 is also responsible for skipping frames when processor load is saturated and such saturation is not short-lived (transient) enough to be fixed by scaling the frame rate alone.

Video decoding is a periodic process, namely it uses processor power for specific intervals of time in a repeated fashion. Although it is important that the period for performing a periodic task is as accurate as possible, it is generally desirable to ensure that the mobile device 10 respond to user related tasks in a timely manner. As discussed above, some processor tasks use up significant processor power such that interactive tasks like cursor 18 movements are adversely affected and clearly noticeable to the user. Typically, user related tasks 139 are lower priority threads that are neglected when the processor 64 becomes saturated. It has been recognized that the lower priority threads, especially on a mobile device 10, may need to operate in most situations for the mobile device 10 to be considered 'usable'. As such, even though, e.g. a multimedia file 120 could be decoded in real time, a limit on the processor usage is set to ensure that the user-related tasks 139 can occur without more than a transient saturation. The compensation procedure performed by the compensation module 152 scales the frame rate and, if necessary, skips frames in an adaptive manner, to lessen such adverse affects.

Figure 9:
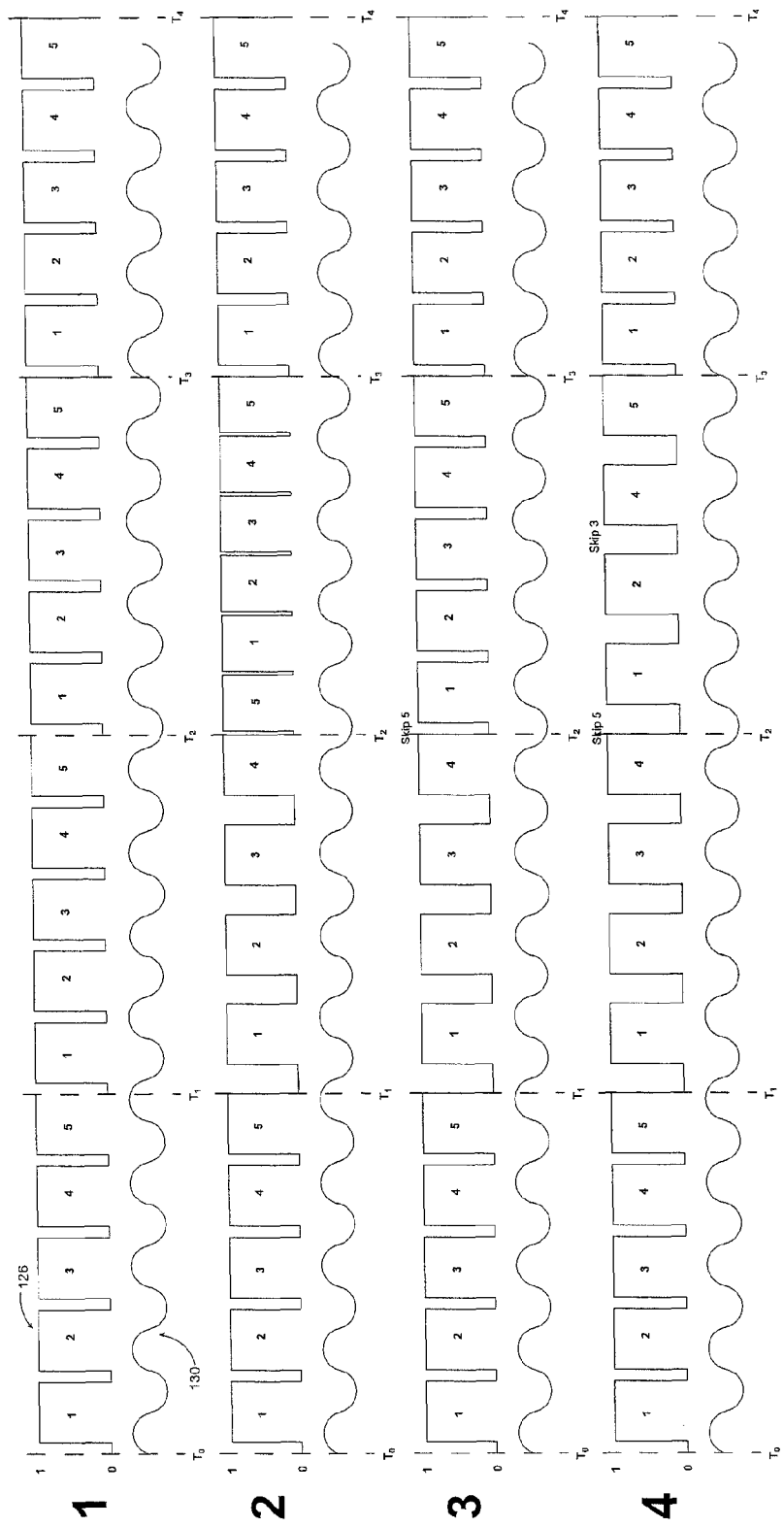
FIG. 9 is a series of timing diagrams illustrating operation of the compensation module shown in FIG. 8.

Turning now to FIG. 9, a series of generalized timing diagrams are shown to illustrate the effect of the scaling module's operations when scaling the frame rate and/or skipping frames. In FIG. 9, for ease of explanation, it will be appreciated that each period represents either a single frame 128 or a block of frames, e.g. those frames that are grouped with a particular leading I-frame. For each period, the portion at "1" indicates the amount dedicated to video decoding and thus consuming processor resources, and "0" indicates that video decoding is not occurring and the processor resources are available to and/or being used by other tasks 124. FIG. 9 also shows a generic waveform along with each video timing diagram representing the corresponding stream of audio data 130. It has been recognized that where compensation of a multimedia output is required, degradation of the video data stream 126 is generally more agreeable than degradation of the audio data stream 130 since the human eye is generally less sensitive to variations in frame rate than the human ear. As such, it can be seen in the timing diagrams in FIG. 9 that the audio data stream 130 maintains a consistent rate whilst the frame rate for the video data stream 126 is compensated as needed in order to re-align with the audio data stream 130 at some point.

The compensation module 152 continuously monitors and schedules the decoding process, e.g. as shown in FIG. 9, and may decode any number of frames in a group and skip the other frames as will be explained below. In this way, all frames may be decoded, down to zero in a particular group. It is understood that decoding zero frames in every group causes no video to be played. If a group is skipped entirely, the additional processor time that is made available can be used to pre-decode for the next group thus avoiding the existence of two subsequently skipped groups.

Timing diagram 1 in FIG. 9 shows a normal decode sequence where the processor 64 is capable of decoding the multimedia file 120, i.e. both video data stream 126 and audio data stream 130, in 'real time' at the target frame rate 132 which produces the period shown. As shown in FIG. 9, each time block $T_i$ includes five frames 128, numbered 1-5. For ease of explanation, i=0 to 4 in this example. Each time period T is equal to 1 second for simplicity. Therefore, in timing diagram 1, the target frame rate 132 is 5 frames per second (fps). When examining the subsequent timing diagrams 2 to 4, a cross-reference may be made to timing diagram 1 to ascertain how the video data stream 126 is being compensated in the scenarios depicted.

Turning now to timing diagram 2, it can be seen that between $T_1$ and $T_2$, the frame decode rate has been slowed down and thus only frames 1-4 are decoded in the same time that five frames would normally decode (i.e. 4 fps). It can be appreciated that by slowing down the frame rate, e.g. from 24 fps to 18 fps in a realistic situation, the processor time dedicated to video decoding can be decreased thus freeing up processor time for other tasks such as the user tasks 139 or other transient tasks such as radio traffic. As will be explained in connection with the method described below, the compensation module 152 may reduce the frame rate to compensate for both transient saturation issues and continuous saturation issues.

Also in timing diagram 2, at $T_2$, it is determined that whatever was saturating the processor 64 between $T_1$ and $T_2$ has gone away, and thus the compensation module 152 re-scales the frame rate to 'catch up' or 'resynchronize' with the audio stream. As can be seen in timing diagram 2, the new frame rate enables six frames to be decoded between $T_2$ and $T_3$. This enables frame 5 that was not able to be decoded between $T_1$ and $T_2$ to be decoded, in addition to frames 1-5 of the next sequence (i.e. 6 fps in this time period). As such, at $T_3$, the video stream is resynchronized with the audio stream (when compared to timing diagram 1). In this example, since the saturation was transient, e.g. occurring sometime around $T_1$, the frame rate can return to the target frame rate 132 as that which occurred between $T_0$ and $T_1$. As shown below, rescaling (speeding up) the frame rate to 'catch up' competes against the goal of managing processor load since a faster frame rate requires more processor time (i.e. less is available for other tasks 139). However, when saturation is transient, the compensation module 152 may be able to catch up in the next 1 s time interval as shown in timing diagram 2.

Turning next to timing diagram 3, another scenario is shown wherein the compensation procedure utilizes both a variable frame rate and frame skipping. As before, the video decode sequence between $T_0$ and $T_1$ is at the target frame rate 132. At or around $T_1$ it is determined that the processor 64 has become saturated. Although the saturation may be transient, it may also be more or less 'constant'. The compensation module 152 first scales the frame rate between $T_1$ and $T_2$ as in timing diagram 2. However, at $T_2$, it is determined that, in order to catch up from the degradation (slow down) imposed between $T_1$ and $T_2$ in the next time block, i.e. $T_2$ to $T_3$, rescaling the frame rate alone will not resynchronize the video stream and the audio stream. This may be due to a particularly bad (prolonged) transient effect or constant saturation (e.g. another intensive program is running at the same time as the video player 88).

In this example, it is determined that the frame rate can only be rescaled back up to the target frame rate 132 without further saturating the processor 64 between $T_2$ and $T_3$. In order to resynchronize during this period, a frame is skipped, e.g. frame 5 from the previous sequence. As can be seen, at $T_3$ the audio and video streams are resynchronized and from $T_3$ to $T_4$ normal decoding occurs. By skipping frames, other frames may also need to be discarded if they depend on each other such as in the case of an I frame and the associated B and P frames. In this case, each frame shown in FIG. 9 can be considered a frame block and each skipped frame represents an I frame and the associated B and P frames in that 'block' or 'group'. As will be explained below, the video decode function 122 discards the frames (i.e. does not decode) but does keep track of how many total frames were skipped for future calculations. If more than one frame 128 is skipped, they may be skipped in succession or spread out during a predetermined interval. Since P and B frames depend on sets of other frames (which can be determined by the module 152), and the I frames do not depend on other frames, the compensation module 152 may choose the group of frames 128 that has the closest duration to the time that is desired to be made up for, such that no frame 128 which is not in the group depends on a frame 128 that is in that group.

Turning next to timing diagram 4, yet another scenario is shown. It can be seen that the frame sequence in timing diagram 4 is the same as in timing diagram 3 up to $T_2$. At this point, it is determined that not only can the frame rate not be rescaled to catch up alone (i.e. frame skipping is needed) but the current scaled down frame rate will be required for the next time period. In this case, since only three addition frames can be decoded between $T_2$ and $T_3$, two frames will need to be skipped in order to catch up in the next 1 s interval. Although the video output on the display 12 may appear somewhat 'choppy' or 'jerky' for a brief period of time, since the audio stream will not be disrupted, in this example, at $T_3$, the video will catch up and the audio should appear smooth. For long transient saturation or constant saturation, both a slower frame rate and frame skipping may be needed either continuously throughout the video, or for certain extended (and/or periodic) blocks of time in order to leave a buffer of processor time available to enable the mobile device 10 to be usable. In timing diagram 4, frame 5 from the previous sequence is skipped and frame 3 from the next sequence. It will be appreciated that where the frames in FIG. 9 represent groups of frames, the 'skipped' frames may be an I-frame with those B and P frames associated with that I-frame. In a general sense, where the 'skipped' frames are individual frames, the choice of which frames to skip can be made according to the nature of the video itself, based on the specific encoding/decoding process being used and/or to maintain continuity (e.g. do not skip two frames in a row).

Figure 10:
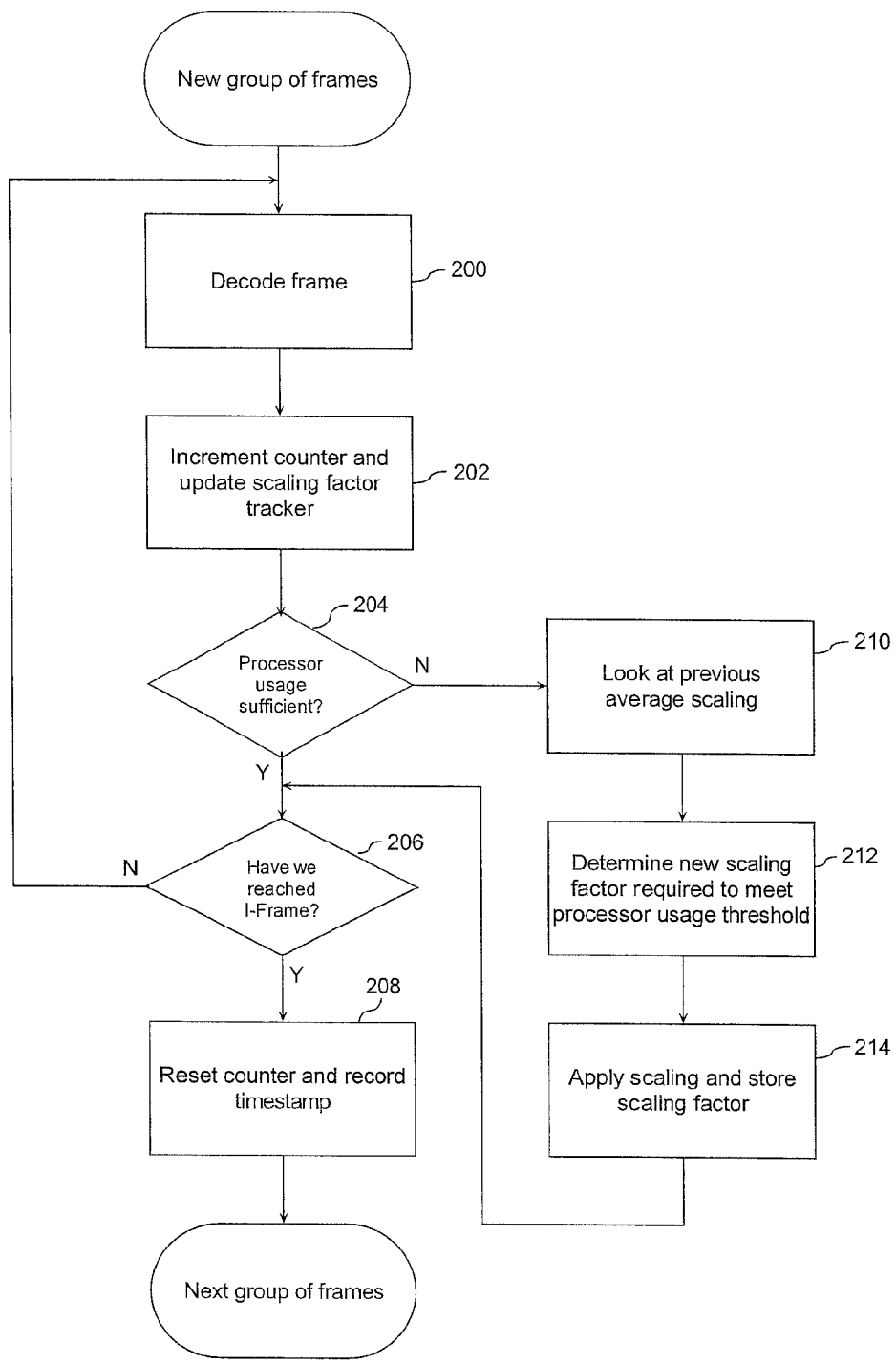
FIG. 10 is a flow diagram illustrating a procedure executed according to a frame rate timer.
Figure 11:
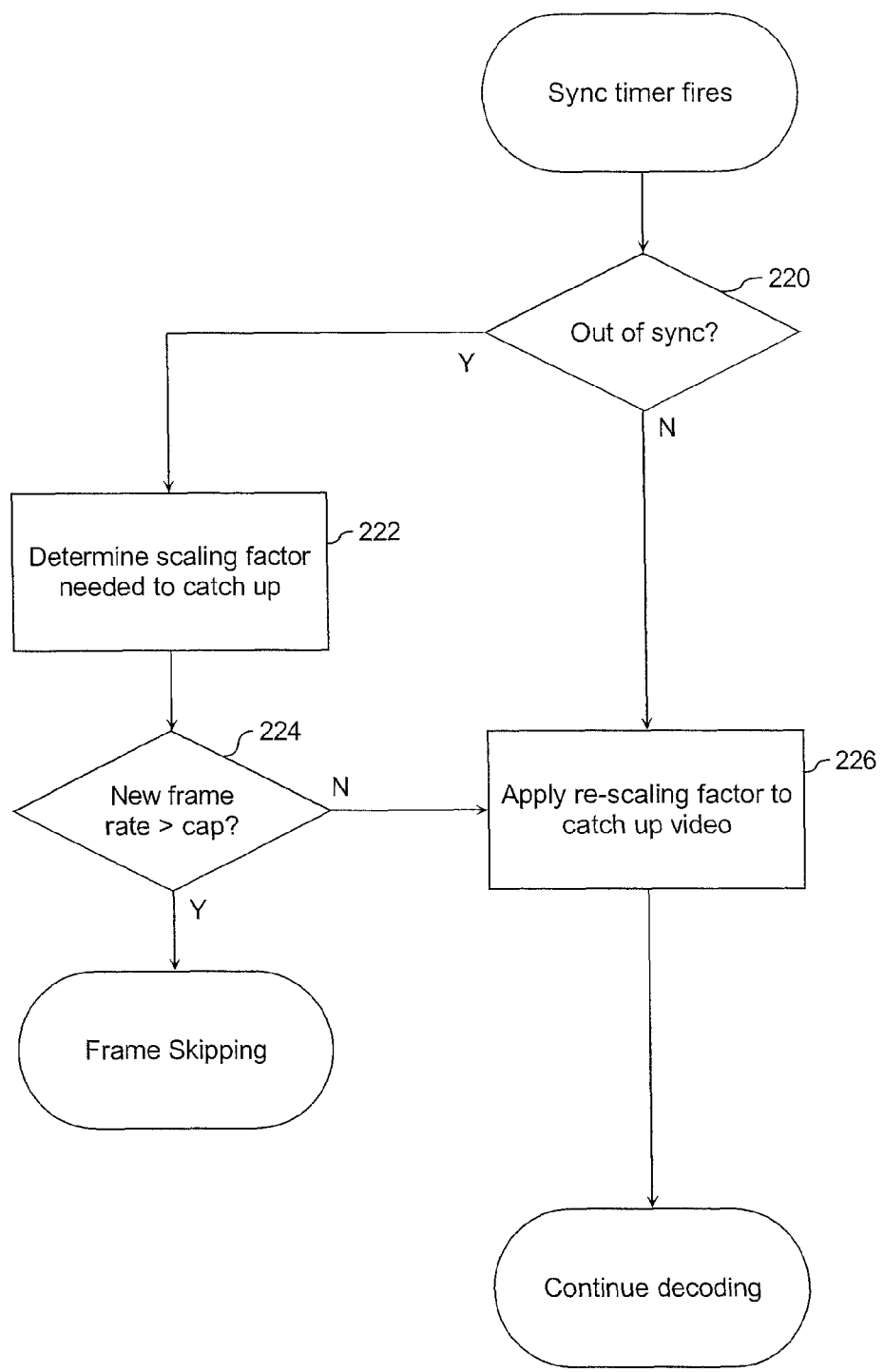
FIG. 11 is a flow diagram illustrating a procedure executed according to a synchronization timer.

FIGS. 10 and 11 illustrate an example algorithm for performing a variable frame rate and frame skipping compensation procedure when scheduling a video decode stream, to alter the video data stream 126, as shown generally in the timing diagrams in FIG. 9, and described above. In this example algorithm, frames are evaluated as frame blocks or groups of I, P and B frames.

Turning first to FIG. 10, a procedure that is executed by the compensation module 152 according to the 'firing' or periodic interval of the frame rate timer 160 is shown. As noted above, the multimedia file 120 provides a target frame rate 132 that dictates the desired period at which to play the video on the display 12. The video player 88 will attempt to play the video at this desired rate by setting the frame rate timer 160 operated by the video decode task 122 accordingly. In this way, the video player 88 normally attempts to schedule the video decodes such that they occur once per period. For example, if the desired frame rate is 25 fps, the decoder module 150 attempts to decode one frame every 40 ms. In this case, the frame rate timer 160 would 'fire' every 40 ms.

The procedure shown in FIG. 10 repeats for each group of frames, and consequently maintains the frame count 154 as a reference to how many frames have been decoded since the last I-frame was encountered. After each frame 128 is decoded at step 200, the frame count 154 is incremented by one at step 202. In step 202, the current scaling factor being applied to the frame (i.e. deviation from target frame rate 132) is added to a scaling count 156. The scaling count 156 tracks the scaling applied over time to determine average scaling for predicting if future rescaling can be performed to catch up the video with the audio.

For each frame 128 that is decoded, the compensation module 152 determines if the current processor usage is sufficient at step 204 by determining if the amount of processor time given to an idle task (not shown) and other applications 80, since the last I-frame, is a sufficient percentage of the total processor time consumed since the last I-frame. The idle task represents the amount of time that the processor 64 is not performing any task. Reference is made to the I-frame, since any group of frames 128 that can be displayed starts with an I-frame as frames 128 in such a decoding scheme, cannot be decoded unless the frame 128 is either an I-frame or the frame 128 before was also decoded. As such, when an I-frame is decoded, it is possible to drop out of the group (i.e. skip the remaining frames 128 in the group) if the particular group of frames is using too much processor power to decode. The process may then begin again at the next I-frame.

If the amount of time is sufficient, this means that the amount of processor time dedicated to idle tasks and other applications 80 is greater than a predetermined threshold. Setting this threshold low makes the video decoding smoother, whereas setting it high makes applications more responsive. The threshold can vary based on the nature of the mobile device 10 and what applications 80 and features are generally available. The threshold should be chosen so that the mobile device 10 is responsive and the processor time is balanced. The decoder module 150 then determines if the next frame is an I-frame, i.e. we are at the end of a group of frames, at step 206. If not, steps 200-204 are repeated for the remaining frames. If so, for each I-frame that is encountered, the frame counter 154 is reset and a timestamp recorded for the leading I-frame of the next block at step 208 and the next group of frames 128 can be decoded. When the target frame rate 132 is achievable without any compensation, these steps above will repeat until saturation occurs.

If the amount of time is insufficient (saturation detected), then compensation module 152 will scale down the frame rate. At step 210, the compensation module 152 first looks at the previous scaling performed per what is stored in the scaling count 156. This is done to determine of the amount of processor usage dedicated to the applications 80 currently running, what percentage is consumed by the video decode task 122, and what percentage is dedicated to the other tasks 124. If the amount of processor usage consumed by the other tasks 124 stays the same, and considering the previous average scaling, it may then be determined how the video decoding task 122 should be scaled in order to have the total processor usage for the applications 80 and the idle task meet a particular threshold or target usage at step 212. This target usage is based on a predetermined maximum processor usage that leaves enough processor power to accommodate user related tasks 139.

Based on the above determination at step 212, a scaling factor can be applied at step 214 and this scaling factor added to the scaling count 156 so that if the frame rate is decreased (slowed), it can later be rescaled by increasing (speeding up) the frame rate to catch the video up to the audio. The procedure then determines if the next I-frame is encountered at step 206 and resets the counter 154 if this is true. It can therefore be seen that at each frame decode, the current scaling (and average of previous scalings) is examined. For example, if at a first frame 128, the frame rate is decreased, the decode for the next frame 128 is slower and, if the saturation is transient, the compensation module 152 may determine once that next frame 128 is decoded, the video can be rescaled. However, if at the next frame, the processor usage does not correct, further scaling can be performed and thus the frame rate can be decreased at each frame 128 and then readjusted if necessary when the sync timer 162 fires as will be explained below.

Turning now to FIG. 11, a procedure performed whenever the sync timer 162 fires is shown. The sync timer 162 can be set to fire at a predetermined interval, e.g. 1 s. This interval should be chosen to balance the competing objectives of enabling enough time to catch up the video while not having too long of a gap with 'bad video'. It will be appreciated that the interval can also be linked to other parameters such as for each group of frames (i.e. monitor environment at every I-frame). However, it will be appreciated that since I-frames do not appear at consistent intervals, this alternative may result in poorer performance (or fire too often) than an arbitrary but consistent interval. In this example, the sync timer 162 fires every 1 s.

As noted above, if the processor usage does not correct itself (i.e. the saturation is not transient enough), simply slowing down and then attempting to speed up the frame rate timer 160 may cause the playback to be too slow and frames 128 may need to be skipped to catch up or to periodically resynchronize the video and the audio. When the sync timer 162 fires, the decoder module 150 first determines if the video and audio are out of sync at step 220. If not, then frames 128 may continue to be decoded as the frame timer 160 fires (e.g. per FIG. 10). If the video and audio is out of sync, the decoder module 150 then determines the scaling factor that would be required to catch up the video to the audio at step 222.

The decoder module 150 then looks at the required scaling factor at step 224 and if the new frame rate that would be required to catch up is greater than the frame rate cap 158, frames 128 need to be skipped. The frame rate cap 158 ensures that the compensation module 152 does not compete with itself, since an increase in frame rate ultimately increases the overall processor usage. The frame rate cap 158 is a target value that is intended to leave enough processor power to the user related tasks 139 such that the response to these tasks is not detrimental to the usability of the mobile device 10. The frame rate cap 158 is typically dependent on the number of user related tasks 139 and the overall processor power. As such, the frame rate cap 158 will vary from mobile device 10 to mobile device 10. Therefore, the frame rate cap 158 avoids 'overcompensating' in terms of scaling. If the frame rate cap 158 does come into effect at step 224, this signifies that whatever task(s) was/were consuming a large amount of processing time was not sufficiently transient to be compensated for in the next sync timer cycle (e.g. 1 s). If the frame rate cap 158 does not come into effect at step 224, the scaling can be applied to the frame rate at step 226 to compensate and thus catch up the video to the audio according to the determination made at step 222.

Figure 12:
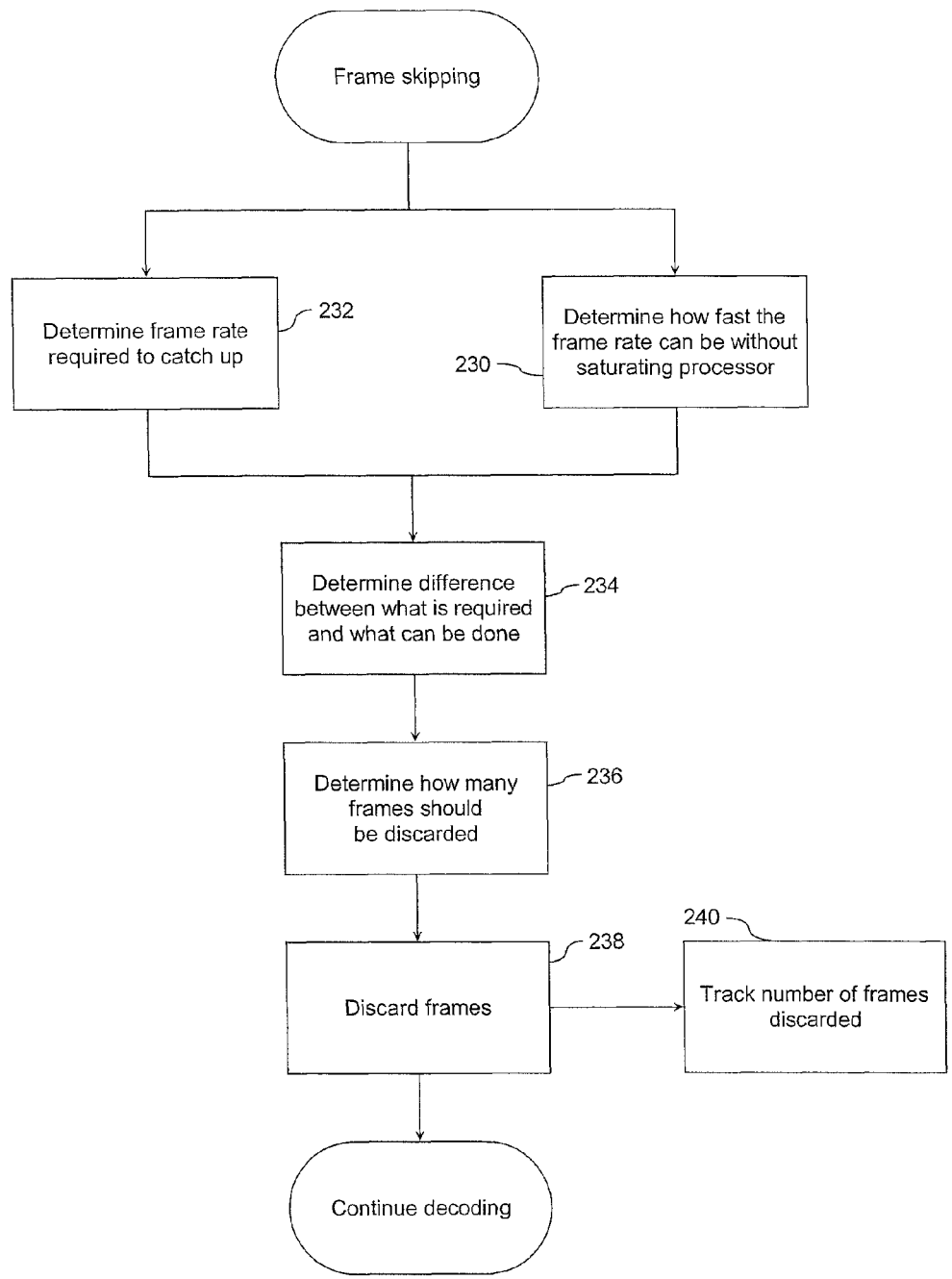
FIG. 12 is a flow diagram illustrating a frame skipping procedure.

If frames 128 need to be skipped, the procedure shown in FIG. 12 may be executed. To skip frames 128, the compensation module 152 first determines how fast the frame rate timer 160 can be set without saturating the processor 64 at step 230 and determines the frame rate that would be required to catch up the video to the audio at step 232. At step 234, the compensation module 152 then determines the difference between what is required to compensate for the lag in the video and what can be done according to the restrictions on the processor usage. In other words, it is first determined how fast the frame rate can be set without saturating the processor 64, and then determined how much this differs from how fast the frame rate timer 160 would have to be set in order to resynchronize the video and audio in the next sync timer cycle (e.g. 1 s).

In this example, this can be done by calculating how far back the video data stream 126 will be 1 s from now when compared to where it should be to match up with the audio. This is represented pictorially in FIG. 9, where at $T_2$ in timing diagram 2, the video data stream 126 is two frames behind. When dealing with groups of frames, the compensation module 152 counts back from the next I-frame to determine how many frames would have to be discarded instead of being decoded in order to bring the video back up to the same point as the audio. In general terms, this is illustrated in FIG. 9 in timing diagram 3 where frame 5 from the previous sequence and frame 3 from the next sequence are discarded or decoding thereof is skipped. This example can represent a case where two groups of frames are discarded in order to catch up, namely group 5 from the previous block of groups and group 3 from the next block of groups. When dealing with I-frames, the compensation module 152 can use the frame count 154 to determine how far away from an I-frame we are so that it can schedule how many frames to discard at step 236. It can therefore be seen that the general principles shown in FIG. 9 can be adapted to be used with the various possible encoding and decoding schemes and may apply to both frame-by-frame analysis and group of frames analysis.

These frames 128 are then discarded from the queue at step 238 and are thus not decoded. The compensation module 152 tracks the number of frames 128 that are discarded at step 240 so that when the decoder module 150 reaches such frames in the decode schedule it can count these towards the number of frames having been played in order to calculate how to scale the frame rate timer 160 to maintain a certain percentage of processor usage for the applications 80 and idle task in FIG. 10.

Accordingly, the procedure shown in FIG. 10 operates according to the frame rate timer 160 in order to adapt to the current processor usage and compensate by degrading the video data stream 126 in order to make the mobile device 10 usable. The procedure in FIG. 11 operates less frequently than the procedure in FIG. 10 and periodically evaluates the environment to see if non-transient saturation is causing the scaling to be unable to bring the video back into alignment with the audio as represented in timing diagram 1 of FIG. 9. If necessary, the procedure in FIG. 11 may call the frame skipping procedure shown in FIG. 12 to combine both scaling and frame skipping in an adaptive manner to handle both transient and constant saturation of the processor 64.

It can therefore be seen that the above provides a method of decoding a multimedia file that can handle both transient and constant saturation of the processor 64 by performing a method that may incorporate both a variable frame rate procedure and an adaptive frame skipping procedure as required. The method operates on multimedia files 120 having a video data stream 126 including a series of frames 128 and an audio data stream 130 to be played in synchronization with the video data stream as frames are decoded.

The method comprises decoding the frames of the video data stream and playing the video data stream at a target frame rate while playing the audio data stream therewith. At a first periodic interval, it is determined if the target frame rate can be achieved while meeting a predetermined usage threshold for the processor, wherein if the usage threshold is met, subsequent frames are decoded at the target frame rate, and if the usage threshold is not met, a scaling factor is determined which is required to meet the usage threshold, the target frame rate is modified according to the scaling factor, and subsequent frames are decoded at a modified frame rate. At a second periodic interval, it is determined if the video data stream and the audio data stream are out of synchronization, wherein if the video data stream and the audio data stream are not out of synchronization, subsequent frames are decoded at the target frame rate, and if the video data stream and the audio data stream are out of synchronization, a rescaling factor is determined which is required to catch the video data stream up to the audio data stream, the rescaling factor is applied to the modified frame rate and, if the re-modified frame rate does not exceed a capped frame rate, subsequent frames are decoded at a re-modified frame rate until the video data stream is resynchronized with the audio data stream.

If the re-modified frame rate does exceed the capped frame rate, subsequent frames are decoded at the capped frame rate while skipping the decoding of one or more frames to be decoded within a next time interval.

It will be appreciated that the examples described above are for illustrative purposes only and many other variations can be used according to the principles described. This applies, e.g. to general computing devices that are used to decode and display video, both mobile and stationary.

Although the above has been described with reference to certain specific embodiments, various modifications thereof will be apparent to those skilled in the art as outlined in the appended claims.

The invention claimed is:

1. A method of providing a multimedia output on a device, the multimedia output comprising a video output providing a series of video frames and an audio output to be played with the video output, the method comprising:
    playing the multimedia output;
    determining at a first periodic interval that a limit in usage of a processor for the device has been reached;
    in response to reaching the limit in usage, modifying the multimedia output according to a first scaling factor to reduce processor usage, by modifying a frame rate for the video output without degrading the audio output, the first scaling factor being determined according to an amount of the modifying that is required to meet a predetermined processor usage target;
    after determining at a second periodic interval that the video output is out of synchronization with respect to the audio output, determining a second scaling factor indicative of new frame rate required to resynchronize the video output with respect to the audio output; and
    further modifying the video output by applying the second scaling factor when the new frame rate is at or below a capped frame rate, and decoding subsequent frames at the capped frame rate while skipping one or more of the video frames during a next time interval when the new frame rate is above the capped frame rate.

2. The method of claim 1, wherein the further modifying comprises rescaling the frame rate of the video output to enable the video output to catch up to the audio output.

3. The method of claim 2, wherein the rescaling is capped to avoid saturating the processor.

4. The method of claim 1, wherein the audio output maintains a consistent rate.

5. The method of claim 1, wherein the series of video frames are decoded in groups of I, B and P frames.

6. A device configured for providing a multimedia output comprising a video output providing a series of video frames and an audio output to be played with the video output, the device comprising:
    a processor for playing the multimedia output;
    a display for providing the video output;
    at least one speaker for providing the audio output; and
    a memory comprising computer executable instructions for:
    determining at a first periodic interval that a limit in usage of a processor for the device has been reached;
    in response to reaching the limit in usage, modifying the multimedia output according to a first scaling factor to reduce processor usage, by modifying a frame rate for the video output without degrading the audio output, the first scaling factor being determined according to an amount of the modifying that is required to meet a predetermined processor usage target;
    after determining at a second periodic interval that the video output is out of synchronization with respect to the audio output, determining a second scaling factor indicative of a new frame rate required to resynchronize the video output with respect to the audio output; and further modifying the video output by applying the second scaling factor when the new frame rate is at or below a capped frame rate, and decoding subsequent frames at the capped frame rate while skipping one or more of the video frames during a next time interval when the new frame rate is above the capped frame rate.

7. The device of claim 1, wherein the further modifying comprises rescaling the frame rate of the video output to enable the video output to catch up to the audio output.

8. The device of claim 7, wherein the rescaling is capped to avoid saturating the processor.

9. The device of claim 6, wherein the audio output maintains a consistent rate.

10. The device of claim 6, wherein the series of video frames are decoded in groups of I, B and P frames.

11. A non-transitory computer readable medium containing computer executable instructions for providing a multimedia output on a device, the multimedia output comprising a video output providing a series of video frames and an audio output to be played with the video output, the computer executable instructions comprising instructions for:

playing the multimedia output;

determining at a first periodic that a limit in usage of a processor for the device has been reached;

in response to reaching the limit in usage, modifying the multimedia output according to a first scaling factor to reduce processor usage, by modifying a frame rate for the video output without degrading the audio output, the first scaling factor being determined according to an amount of the modifying that is required to meet a predetermined processor usage target;

after determining at a second periodic interval that the video output is out of synchronization with respect to the audio output, determining a second scaling factor indicative of a new frame rate required to resynchronize the video output with respect to the audio output; and further modifying the video output by applying the second scaling factor when the new frame rate is at or below a capped frame rate, and decoding subsequent frames at the capped frame rate while skipping one or more of the video frames during a next time interval when the new frame rate is above the capped frame rate.

12. The non-transitory computer readable medium of claim 11, wherein the further modifying comprises rescaling the frame rate of the video output to enable the video output to catch up to the audio output.

13. The non-transitory computer readable medium of claim 12, wherein the rescaling is capped to avoid saturating the processor.

14. The non-transitory computer readable medium of claim 11, wherein the audio output maintains a consistent rate.

* * * * *